Patented Dec. 27, 1949

2,492,658

UNITED STATES PATENT OFFICE 2,492,658

METALATION OF THIOPHENE

John W. Schick, Camden, and Howard D. Hartough, Pitman, N. J., assignors to Socony-Vacuum Oil Company, Incorporated, a corporation of New York No Drawing. Application November 9, 1946,
Serial No. 708,943

8 Claims. (Cl. 260—329)

This invention relates to a process for the metalation of thiophene and, more particularly, is concerned with a method for preparing a thienylsodium.

One widely employed method for preparing inorganic salts is by the interaction of an acid with a metal. In a similar manner, salts can be prepared from the action of a metal on an organic compound containing one or more acidic hydrogen atoms. Such reactions involving replacement of an acidic hydrogen by a metal atom to yield an organo-metallic compound illustrate transformations generally referred to as metalation.

In most instances direct metalation of an organic compound with a metal is extremely difficult, if not impossible, to attain. In order to circumvent the difficulties accompanying direct metalation, organic salts have been used in some cases as metalating agents. The use of such salts is influenced both by the strength of the acidic compound being treated and the polarity of the salt used. Thus, metalation with a salt, sometimes referred to as transmetalation, involves the reaction of a salt of a relatively week acid with a stronger acid to form the salt of said stronger acid and said weak acid. The reaction may be designated by the following general equation:

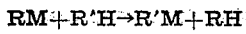

This equation illustrates the displacement of a metal M from a salt of a week acid by the relatively stronger acid R'H to yield the weaker acid RH and the desired organo-metallic compound R'M. A specific example of the above general equation is the metalation of benzene with ethylsodium to yield phenylsodium as shown by the following:

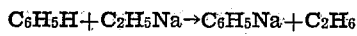

This reaction thus indicates that the nuclear hydrogen atoms of benzene are more acidic than those of ethane.

Attempts to metalate thiophene by transmetalation reactions similar to those discussed above, using an alkylsodium as the metalating agent, yielded no thienylsodium. This compound has been prepared in the past by the reaction of thiophene with organo-mercury compounds and sodium. Such methods have been unsatisfactory, resulting in small yields of thienylsodium despite the relatively high reaction temperatures employed and the excessively long reaction periods of the order of one day or more. These methods, moreover, require the previous preparation of expensive organo-mercury compounds and hence do not at all lend themselves to the production of metalated thiophenes in commercial quantities.

It has now been discovered that thiophene can be metalated in an efficient manner by contacting the same with an organic halide in the presence of a sodium amalgam under particular conditions hereinafter described in detail to yield a thienylsodium. It has been found that by carrying out the reaction in the presence of an amalgam, the above-mentioned difficulties encountered in the metalation of thiophene have been largely overcome. Thus, the process of the present invention can be carried out as a one-step method in preparing thienylsodium compounds, eliminating the heretofore necessity of preparing organo-mercury derivatives for use in the metalation reaction. Moreover, the desired metalated thiophenes are obtained in accordance with the process described herein in substantially higher yields than those heretofore obtained without necessitating the excessively long reaction periods required by the previously employed methods.

In accordance with the process of this invention, metalated thiophene compounds are prepared by the interaction of thiophene, sodium amalgam, and an alkyl, aralkyl, or aryl halide in the presence of an inert organic solvent to yield a thienylsodium. Any of the commonly employed organic solvents which are inert to sodium may be used in the present process. Preferred solvents include alkyl ethers, dialkyl ethers of glycols, and hydrocarbons such as benzene, hexane, and the like.

The function of the alkyl, aralkyl, or aryl halide in the metalation reaction of this invention appears to lie in the intermediate formation of the corresponding alkyl, aralkyl, or arylsodium as a result of the reaction with sodium amalgam, said organo-sodium intermediate in turn serving as a metalating agent in the presence of the amalgam to yield a transmetalation product of thienylsodium. Any of the alkyl, aralkyl, or aryl halides commonly employed in preparing organic salts may, accordingly, be used in the process of this invention. Usually, however, for economic reasons the shorter chain alkyl halides, such as ethyl chloride, propyl chloride, butyl chloride, and easily obtainable aryl halides, such as chlorobenzene, bromobenzene, chlorotoluenes, bromnaphthalenes, and the like will be employed.

While the process of this invention is, of course, not to be limited by any theory, it would appear that the presence of mercury in the amalgam employed behaves as a catalyst in promoting the metalation reaction. Thus, in the absence of any mercury or amalgam, the contacting of thiophene with an alkyl or arylsodium fails to yield a thienylsodium. The amount of mercury present in the sodium amalgam may vary from about 0.02 to about 0.25 gram atoms per mole of thiophene being treated. Generally, the amount of mercury present in the amalgam will be preferably between about 0.10 and about 0.25 grams atoms per mole of thiophene.

Due to the high reactivity of sodium amalgam and the resultant thienylsodium, it is essential to exclude moisture and air from the reaction zone and to carry out the process of this invention in an inert atmosphere, such as nitrogen or other of the inert gases. If the solvent employed is one of low boiling point, such as diethyl ether, the vapor of said solvent may provide the inert atmosphere under which the reaction takes place.

The various reactants used in metalating thiophene in accordance with the process of this invention may be contacted in a number of ways. Thus, if desired, the amalgam may be added to a solution of thiophene in the inert solvent, followed by addition of the organic halide to the mixture, or the organic halide may be added to a mixture of thiophene and the sodium amalgam. The organic halide may be either added to the mixture of thiophene and sodium amalgam as a liquid or, if it is gaseous at the particular temperature employed, it may be bubbled into the mixture. A modification which has been found to be particularly adaptable in using the present invention comprises adding a solution of the organic halide in the inert solvent cooled to a temperature below its boiling point to a solution of thiophene and sodium amalgam dust. However, the present invention contemplates other modifications and order of addition of the reactants which will be readily recognized by those skilled in the art.

Initial contact between the reactants as indicated is preferably made at a low temperature of the order of 0° C. to 10° C. After the reactants are brought into contact, the metalation reaction proceeds. Since the rate of this reaction is dependent on the temperature, increasing with increasing temperature, the process will usually be carried out at a higher temperature. It has been found, however, that at temperatures above the melting point of sodium amalgam employed, the yield of desired product is drastically reduced, presumably due to fusion of the amalgam. The melting point of the particular amalgam employed accordingly will constitute the upper temperature limit under which metalation is effected in accordance with the present invention. The melting point of the amalgam will, of course, depend on its sodium and mercury content but will not exceed 97° C. The reaction is conveniently carried out at the reflux temperature of the inert organic solvent used, provided that said temperature does not exceed the melting point of sodium amalgam. The reaction may, if desired, be carried out under pressure, although ordinarily the process proceeds readily at atmospheric pressure. The reaction rate, and consequently the yield of desired product obtained in a given time, was also found to be dependent upon the particle size of the sodium amalgam used. In general, the smaller the particle size of the amalgam, the faster was the rate of reaction. Accordingly, finely divided sodium amalgam is to be preferred for use in the present process. The amalgam particles used in the reaction of this invention were prepared by heating sodium and mercury in an atmosphere of nitrogen until a molten mass was obtained and then vigorously stirring to form an amalgam sand. While this is a convenient method of preparing amalgam in finely divided form, it will be realized that any other means of finely dividing the amalgam may likewise be employed.

The compound resulting from the process of this invention, namely, 2-thienylsodium having a strongly electro-positive atom attached to the thiophene ring, is useful as an intermediate in the synthesis of derivatives of thiophene which, in turn, find use in the manufacture of plastics, pharmaceuticals, dyes, addition agents for petroleum fractions, odorants, synthetic lubricants, waxes, extreme pressure additives for mineral oils and anti-foaming agents. The thienylsodium compound produced in accordance with the method disclosed herein may thus be subjected to sulfonation, carbonation, halogenation, acylation, alkylation, hydrogenation, nitration, etc., to yield useful derivatives of thiophene. The compound may also be coupled or condensed with other molecules by reacting with various other metals and, in general, undergo a multitude of reactions characteristic of organo-sodium compounds.

The following detailed examples will serve to illustrate the method of metalating thiophene in accordance with this invention without limiting the same.

*Example 1*

A cold mixture of 16 grams (0.25 mole) of ethyl chloride in 200 milliliters of anhydrous diethyl ether was added dropwise over a 1-hour period to a vigorously stirred mixture, cooled to a temperature of 5–10° C., of 42 grams (0.5 mole) of thiophene, 100 milliliters of anhydrous diethyl ether and freshly prepared sodium amalgam dust composed of 15 grams (0.65 gram atom) of sodium and 25 grams (0.125 gram atom) of mercury. The reaction mixture was maintained under an atmosphere of nitrogen and during the addition was cooled by an ice bath. After the addition was completed, the ice bath was removed and the reaction mixture was warmed to a reflux temperature of 35° C. for 2½ hours. The product resulting from said reaction was identified as 2-thienylsodium.

Such identification was effected by carbonating the product by addition thereto of small pieces of freshly crushed Dry Ice. Unreacted sodium was destroyed with 50 milliliters of ethanol, after which 150 milliliters of distilled water were added cautiously. The resulting aqueous layer was separated and acidified with 75 milliliters of concentrated hydrochloric acid to yield 14 grams (44 per cent yield) of crude 2-thiophenecarboxylic acid. This product, upon recrystallization from hot water, yielded white, needle-like crystals having a melting point of 126–127° C. The mixed melting point of this product with an authentic sample of 2-thiophenecarboxylic acid gave no depression.

*Example 2*

A cold mixture of 16 grams (0.25 mole) of ethyl chloride in 200 milliliters of anhydrous diethyl ether was added dropwise over a 1-hour period to a vigorously stirred mixture, cooled to 5–10° C., of 49 grams (0.58 mole) of thiophene, 100 milliliters of anhydrous diethyl ether and freshly prepared sodium amalgam dust composed of 15 grams (0.65 gram atom) of sodium and 25 grams (0.125 gram atom) of mercury. The reaction mixture was maintained under an atmosphere of nitrogen and during the addition was cooled in an ice bath. After the addition was completed, the ice bath was removed and the reaction mixture was warmed to a reflux temperature of 35° C., at which temperature it was maintained for 2½ hours. The product resulting from said reaction was identified as 2-thienylsodium.

Such identification was effected, as in Example 1, by carbonating the product to yield 19 grams (60 per cent yield) of 2-thiophenecarboxylic acid which, upon recrystallization, had a melting point of 126–127° C.

*Example 3*

A cold mixture of 16 grams (0.25 mole) of ethyl chloride in 150 milliliters of normal hexane was added dropwise over a 1-hour period to a cooled, vigorously stirred mixture of 49 grams (0.58 mole) of thiophene, 100 milliliters of normal hexane and freshly prepared sodium amalgam dust composed of 15 grams (0.65 gram atom) of sodium and 12 grams (0.06 gram atom) of mercury. The reaction mixture was maintained under an atmosphere of nitrogen and during the addition was cooled in an ice bath. After the addition was completed, the reaction mixture was heated at a temperature of 55° C. for 1 hour. The product resulting from said reaction was subsequently identified by the method described in Example 1 as 2-thienylsodium.

*Example 4*

A cold mixture of 32 grams (0.5 mole) of ethyl chloride in 300 milliliters of anhydrous diethyl ether was added dropwise over a 1-hour period to a mixture, cooled to a temperature of 5–10° C., of 200 milliliters of anhydrous diethyl ether, 63 grams (0.75 mole) of thiophene and sodium amalgam sand containing 25 grams (1.09 gram atoms) of sodium and 3 grams (0.015 gram atom) of mercury. The reaction was carried out in an inert atmosphere of nitrogen to exclude moisture and air. After the addition was completed, the mixture was stirred for an additional ½ hour and then warmed to a reflux temperature of about 35° C. for 2 hours. The product resulting from said reaction was identified as 2-thienylsodium by the method described in Example 1 to yield 1.6 grams (2.5 per cent yield) of 2-thiophenecarboxylic acid.

*Example 5*

A cold mixture of 78 grams (0.5 mole) of bromobenzene in 300 milliliters of anhydrous diethyl ether was added dropwise over a period of 1 hour to a mixture, cooled to a temperature of 5–10° C., of 200 milliliters of anhydrous diethyl ether, 63 grams (0.75 mole) of thiophene and sodium amalgam sand containing 25 grams (1.09 gram atoms) of sodium and 10 grams (0.05 gram atom) of mercury. The reaction was carried out under an inert atmosphere of nitrogen and during the addition was cooled by an ice bath. After the addition was completed, the mixture was stirred for an additional ½ hour and the ice bath was then removed. The reaction mixture was then warmed to reflux for 2 hours to yield a product which was identified as 2-thienylsodium.

Such identification was effected by carbonating the product by the addition thereto of small pieces of freshly crushed Dry Ice. Unreacted sodium was destroyed with 50 milliliters of ethanol, and 150 milliliters of distilled water were then cautiously added. The resulting aqueous layer was separated and acidified with 70 milliliters of concentrated hydrochloric acid to yield 57 grams (89 per cent yield) of crude 2-thiophenecarboxylic acid. This product, upon recrystallization from hot water, yielded white, needle-like crystals having a melting point of 127° C.

We claim:

1. A method for metalating thiophene, comprising contacting the same with an organic halide selected from the group consisting of alkyl, aralkyl, and aryl halides in the presence of an inert organic solvent and a sodium amalgam, maintaining the reaction mixture under an inert atmosphere at a temperature below the melting point of said amalgam to yield a resulting product of thienylsodium.

2. A method for metalating thiophene, comprising contacting the same with an organic halide selected from the group consisting of alkyl, aralkyl, and aryl halides in the presence of an inert organic solvent and a sodium amalgam, maintaining the reaction mixture under an inert atmosphere at the reflux temperature of said inert organic solvent but below the melting point of said amalgam to yield a resulting product of thienylsodium.

3. A method for metalating thiophene, comprising contacting the same with an organic halide selected from the group consisting of alkyl, aralkyl, and aryl halides in the presence of diethyl ether and a sodium amalgam, maintaining the reaction mixture under an inert atmosphere at a temperature below the melting point of said amalgam to yield a resulting product of thienylsodium.

4. A method for metalating thiophene, comprising contacting the same with an organic halide selected from the group consisting of alkyl, aralkyl, and aryl halides in the presence of benzene and a sodium amalgam, maintaining the reaction mixture under an inert atmosphere at a temperature below the melting point of said amalgam to yield a resulting product of thienylsodium.

5. A method for metalating thiophene, comprising contacting the same with an alkyl halide in the presence of an inert organic solvent and finely divided sodium amalgam, maintaining the reaction mixture under an inert atmosphere at a temperature below the melting point of said amalgam to yield a resulting product of thienylsodium.

6. A method for metalating thiophene, comprising contacting the same with an aryl halide in the presence of an inert organic solvent and finely divided sodium amalgam, maintaining the reaction mixture under an inert atmosphere at a temperature below the melting point of said amalgam to yield a resulting product of thienylsodium.

7. A method for metalating thiophene, comprising contacting the same with an organic halide selected from the group consisting of alkyl, aralkyl, and aryl halides in the presence of an inert organic solvent and sodium amalgam, the mercury content of which it at least about 0.02 gram atom per mole of thiophene being treated, maintaining the reaction mixture under an inert atmosphere at a temperature below the melting point of said amalgam to yield a resulting product of thienylsodium.

8. A method for metalating thiophene, comprising contacting the same with an organic halide selected from the group consisting of alkyl, aralkyl, and aryl halides in the presence of an inert organic solvent and sodium amalgam, the mercury content of which is between about 0.10 and about 0.25 gram atoms per mole of thiophene being treated, maintaining the reaction mixture under an inert atmosphere at a temperature below the melting point of said amalgam to yield a resulting product of thienylsodium.

JOHN W. SCHICK.
HOWARD D. HARTOUGH.

REFERENCES CITED

The following references are of record in the file of this patent:

UNITED STATES PATENTS

| Number | Name | Date |
|---|---|---|
| 2,163,846 | Morton | June 27, 1939 |

OTHER REFERENCES

Richter, "Organic Chemistry," pages 649-650, John Wiley, 1938.